June 29, 1937.  J. A. HEIDBRINK  2,085,155
GAS STRAINER AND VAPORIZER
Filed Jan. 17, 1936  2 Sheets-Sheet 2
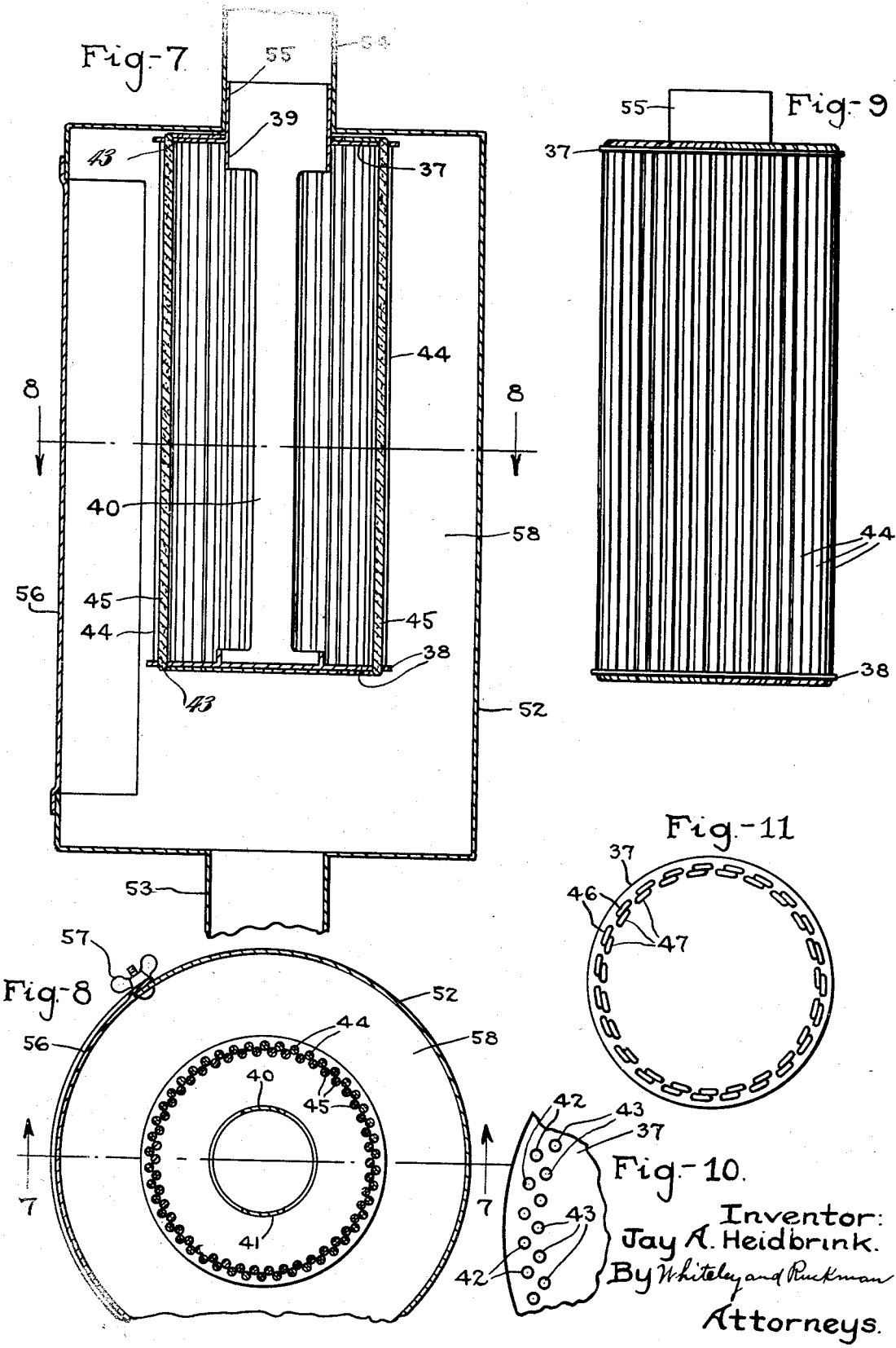
Inventor:
Jay A. Heidbrink.
By Whiteley and Ruckman
Attorneys.

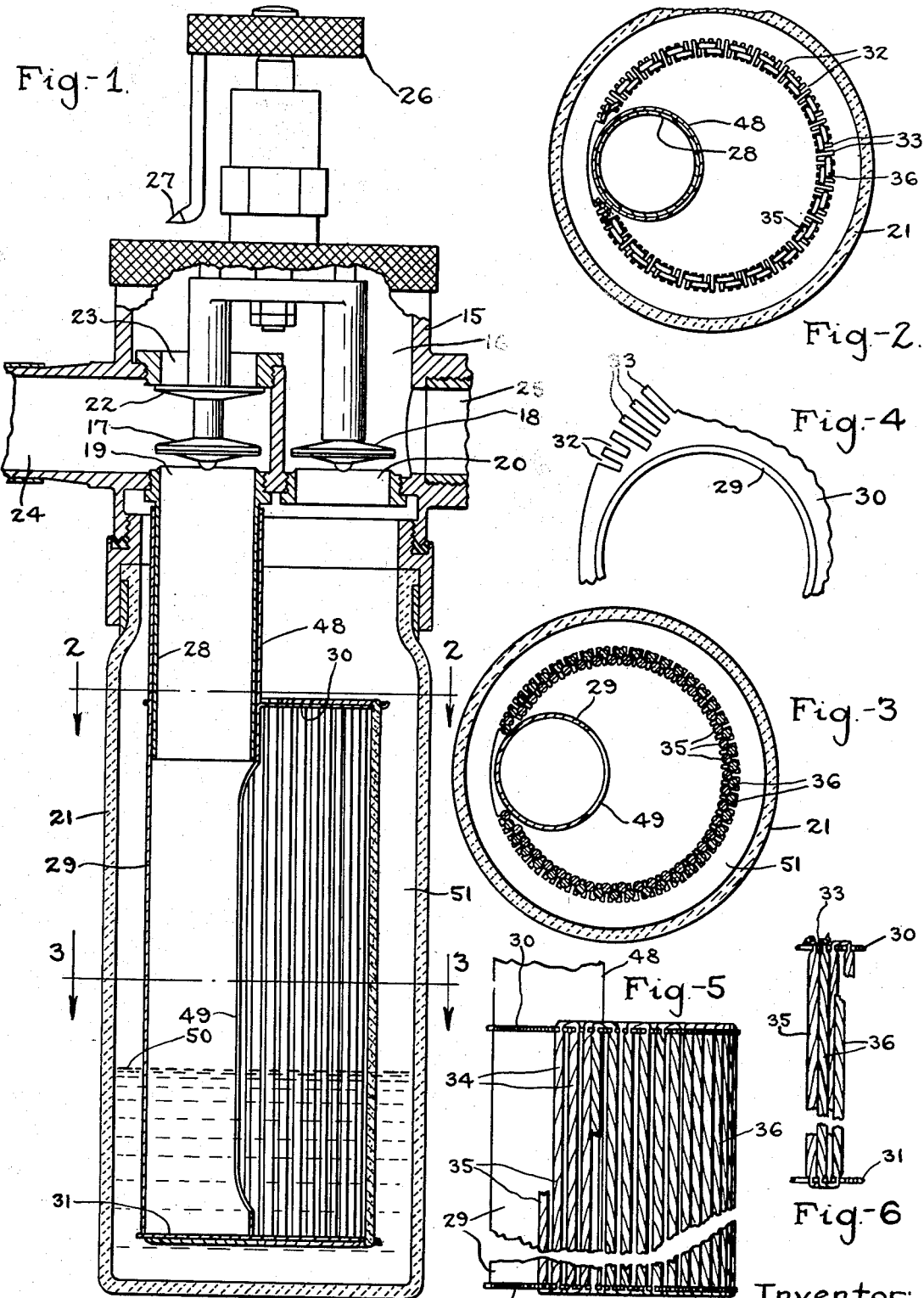

Patented June 29, 1937

2,085,155

UNITED STATES PATENT OFFICE 2,085,155

GAS STRAINER AND VAPORIZER

Jay A. Heidbrink, Minneapolis, Minn.

Application January 17, 1936, Serial No. 59,578

5 Claims. (Cl. 183—49)

My invention relates to gas strainers and vaporizers for use in connection with devices delivering gases for anaesthetizing apparatus, or air, or mixture of gases, for resuscitation or other purposes, to patients receiving therapeutic treatment. The construction also has the highly valuable feature of providing a maximum desirable evaporating area for use in connection with vaporization of gases such as ether being administered to patients. As a gas or air strainer the device may have important functions in the removal of dust from currents of gas where they are or are not employed for therapeutic purposes.

It is an object of my invention to provide a strainer or evaporator for the purpose stated wherein a straining or evaporating wall thereof is formed of a multiplicity of contacting or substantially-contacting cord members formed of any suitable material such as is commonly used in the fabrication of cords, or any other material desirable for the purpose, said cords being held in substantially fixed but contacting relation.

It is a further object of my invention to provide the cords made of such material as wool or long fiber cotton wherein there are a large number of small fibers projecting outwardly in all directions from the shaft of the cord, which fibers tend to intertwine to make more effective the strainer capacity of the device when used as a strainer, and to increase evaporating surface when used as an evaporator.

It is a further object of my invention conveniently to dispose said cords to form the outer wall of a cylinder and to arrange conduits whereby the gases will be delivered either within or without said cylinder and be withdrawn conversely either from without or from within the said cylinder.

The full objects and advantages of my invention will appear in connection with the detailed description thereof, and its novel features are particularly pointed out in the claims.

In the drawings, illustrating applications of my invention in some of its practical forms,—

Fig. 1 is a longitudinal section showing my strainer applied to an ether vaporizer. Fig. 2 is a transverse section taken on line 2—2 of Fig. 1. Fig. 3 is a transverse section taken on line 3—3 of Fig. 1. Fig. 4 is a fragmentary view on an enlarged scale showing the construction for receiving the cords of the device as shown in Fig. 1. Figs. 5 and 6 are longitudinal partial views showing the manner in which the cords are laid in on the form of Fig. 1. Fig. 7 is a sectional elevation view of the strainer device having no connection with an ether vaporizer. Fig. 8 is a transverse sectional view on line 8—8 of Fig. 7. Fig. 9 is an elevation view of the cylinder of cords strung in a different manner from what is shown in Figs. 4, 5, and 6. Fig. 10 is a fragmentary view of the supporting head showing the arrangement of apertures for receiving the cord where it is strung, as in Fig. 9. Fig. 11 shows the manner in which the cords are looped through these apertures.

In Fig. 1 an ether vaporizer, and valve controls therefor, is shown similar to that disclosed in my co-pending application Serial Number 37,499 filed August 23, 1935, wherein a casing 15 is provided forming a valve chamber 16 in which are simultaneously operable valve members 17 and 18 adapted to close inlet port 19 and outlet port 20 leading to the interior of ether jar 21 secured to casing 15. Associated with the valve 17 is a second valve 22 adapted to open and close a port 23 which by-passes the gas from inlet passageway 24 to outlet passageway 25. The valves are controlled by a thumb nut 26 carrying a pointer 27 which cooperates with a scale not shown. The port 19 embodies an extension tube 28 for carrying the inlet gas a substantial distance down into the ether jar, from which it reverses to leave through port 20. The above features are, as stated, thus presented in my aforesaid copending application.

My improvements relate to the strainer and ether vaporizer with which the above instrumentalities cooperate. In the form of my invention applied to an ether vaporizer, as in Fig. 1, a tube 29 is provided which carries rigidly secured thereto top and bottom plates 30 and 31, respectively. These plates are circular in their outer contour and are formed with a multiplicity of slots 32 extending inwardly a requisite distance and separated by a corresponding number of tongues 33. A double layer of longitudinally-extended strands of cord 34 is provided by carrying the cords successively through alternate slots 32 and about pairs of tongues 33 to form an inner layer 35, and thereafter reversing the process to provide a second layer 36 wherein the looping about pairs of tongues is staggered as regards the first looping and the cords of layer 36 engage between pairs of cords of layers 35, all as clearly shown in Figs. 2 and 3.

In the form shown in Figs. 7 to 11 head plates 37 and 38 may be held properly spaced by a central semi-tubular standard 39 cut away along its center to form side-supporting members 40 and 41. The plates 37 and 38 are provided with annular rows of holes 42 and 43, the holes being staggered as clearly shown in Fig. 10. Through these holes 42 and 43 layers of cord members 44 and 45 are strung, the cords being looped through the holes for the respective layers, as indicated at 46 and 47 respectively, and in this way the several cord members of the layers 44 and 45 are caused to engage between pairs of cords of the other layer, as shown in Fig. 8.

In the form of Figs. 1 to 6 the tube 29 is provided with an extension portion 48 which receives the depending tube 28 from the vaporizer casing 15 and the tube 29 as cut away along its sides as indicated at 49 in Figs. 1 and 3. In operation, therefore, this form (of Figs. 1 to 6) permits gas in the breathing line, preferably on the exhale side thereof, to pass through the tubes 28 and 29 and out through opening 49 to the interior of the cylinder formed by the double layer 35, 36 of contacting cords which in practice will dip into a body of ether within the ether jar having a level, for example, indicated at 50. The cords by capillary action carry the liquid ether from the body at the bottom of the jar 21 to the tops of the cords, and the gas in passing through and around the cords will take up saturating quantities of the ether vapor. The gas passes into the annular space 51 around the cylinder of cords, and from there through port 20 to passageway 25 in the breathing line. This arrangement will not only insure easy absorption of ether vapor by the gas, but owing to the fact that the cord surfaces of the layers 35 and 36 are in contact with their many fibers more or less intertwined, there will be a withdrawal of dust or other substance carried by the gas, the device thus operating as a strainer.

In the form of Figs. 7 to 11 the cylinder formed of the cord layers 44 and 45 is preferably supported in a cylindrical container 52 formed with a centrally disposed inlet passageway 53 and a corresponding outlet passageway 54 in which an extension 55 of the tubular member 39 seats. A door or removable closure 56 may be provided on the outside of member 52 held in position by thumb nuts 57.

In this form of the invention the gas to be strained enters outside of the double cylinder of cords 44, 45 and passes into the annular chambers 58 about said cords from which it will go through between the cords, thus being strained of dust or extraneous particles of matter carried thereby, and the tube will lead to any point desired for delivery to a patient or for other uses through the passagway 54.

The advantages of this construction will be apparent from the foregoing description thereof. A large area of strainer surface (which in connection with an ether vaporizer may be employed as evaporating surface) may be provided at a minimum expense. And because the area is relatively large in proportion to the gas passing through, the rate of flow through the strainer itself will be relatively low with little restriction imposed by the cords. Also, where the form of Figs. 7 to 11 is employed, there will be slight pressure of the gas moving from the annular chamber 58 to within the cylinder of cords 44, 45, which will have a tendency to push those cords inwardly slightly narrowing the diameter of the cylinder and compacting the contact of the cords for more efficient straining. In the form of Figs. 1 to 5, where straining is perhaps less important than vaporizing, the movement of the gas is from the inside out and will have a slight tendency to expand the double cylinder of cords 35, 36, resulting in relatively free flow of the gases about the cords, which is desirable in giving anæsthesia where the movement of the gas is effected by the patient.

I claim:

1. A gas strainer and vaporizer comprising an outer casing forming an enclosed chamber, a member within said chamber formed with imperforate end walls except for a passageway through one of them and having side walls formed of a multiplicity of parallel, contacting, longitudinally-extended cords, and two passageways formed to enter said enclosed chamber one of said passageways extending into the interior of said member, whereby gas may be moved to the chamber through one passageway and from the chamber through the other passageway and will be caused to pass through the cord walls of said member in the course of said movement.

2. A gas strainer and vaporizer comprising an outer casing forming an enclosed chamber, a member within said chamber formed with imperforate end walls except for a passageway through one of them and having side walls formed of a multiplicity of parallel, contacting, longitudinally-extended cords, two passageways formed to enter said enclosed chamber one of said passageways extending into the interior of said chamber, whereby gas may be moved to the chamber through one passageway and from the chamber through the other passageway and will be caused to pass through the cord walls of said member in the course of said movement, and valve members cooperating with said passageways to regulate the flow of gas therethrough.

3. A gas strainer and vaporizer comprising an outer casing forming an enclosed chamber, a member within said chamber formed with imperforate end walls except for a passageway through one of them and having side walls formed of a multiplicity of parallel contacting longitudinally-extended cords, a tube connected with one of said end walls and forming a continuation of the passageway thereinto and out of the chamber and supporting said member, and a second passageway into the chamber, whereby gas may be moved to the chamber through one passageway and from the chamber through the other passageway and will be caused to pass through the cord walls of said member in the course of said movement.

4. A gas strainer and vaporizer comprising an outer casing forming an enclosed chamber, a member within said chamber formed with circular discs to provide end walls closed except for a gas passageway through one of them, said discs being formed adjacent their peripheral edges with a series of open slots and intervening tongues, a cord carried back and forth and looped about a plurality of said tongues and extending through the slots to form a circular layer of longitudinally-extended cord members and said cord carried back and forth about a multiplicity of other tongues and extending through the slots to form a second layer of longitudinally-extended cords staggered in relation to the cords of the first layer so that the cords of said two layers will normally contact, and means to direct moving gas to cause it to pass between contacting pairs of cords from said passageway.

5. A gas strainer and vaporizer comprising an outer casing forming an enclosed chamber having a pair of openings thereinto and having valves for controlling said openings, a tube connected with one of said openings and extending within the chamber, a pair of end walls supported on said tube in spaced parallel relation, said tube extending through one of the end walls, a multiplicity of parallel contacting, longitudinally-extended cords forming side walls between the end walls, said tube opening into the space within said side walls.

JAY A. HEIDBRINK.